(12) United States Patent
Sumi (10) Patent No.: US 10,668,652 B2
(45) Date of Patent: Jun. 2, 2020

(54) MOLDING METHOD OF RESIN MOLDED PRODUCT AND RESIN MOLDED PRODUCT

(71) Applicant: KYORAKU CO., LTD., Kyoto (JP)

(72) Inventor: Takehiko Sumi, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 224 days.

(21) Appl. No.: 15/221,667

(22) Filed: Jul. 28, 2016

(65) Prior Publication Data

US 2016/0332343 A1 Nov. 17, 2016

Related U.S. Application Data

(62) Division of application No. 14/130,003, filed as application No. PCT/JP2012/066489 on Jun. 28, 2012, now abandoned.

(30) Foreign Application Priority Data

Jul. 14, 2011 (JP) .................................. 2011-156086

(51) Int. Cl.
*B29C 44/12* (2006.01)
*B29C 51/12* (2006.01)
(Continued)

(52) U.S. Cl.
CPC ...... *B29C 44/1233* (2013.01); *B29C 48/0017* (2019.02); *B29C 48/0021* (2019.02);
(Continued)

(58) Field of Classification Search
CPC ... B29C 51/267; B29C 51/12; B29C 49/0047; B29C 70/70; B29C 2043/182; B29C 47/02–028; B29C 70/68–865
See application file for complete search history.

(56) References Cited

U.S. PATENT DOCUMENTS 4,920,881 A * 5/1990 Tafel .................... B41F 23/0479
101/424.1
4,980,382 A * 12/1990 Sonnenberg ............... C08J 9/18
521/56
(Continued)

FOREIGN PATENT DOCUMENTS

JP 09225990 A * 9/1997 ......... B29C 47/0816
JP 2001-315237 11/2001
(Continued)

OTHER PUBLICATIONS

MT of JP 09225990 A, no date.*
(Continued)

*Primary Examiner* — Alex A Rolland
(74) *Attorney, Agent, or Firm* — Maier & Maier, PLLC (57) ABSTRACT

A molding method of a resin molded product in which it is possible to increase the welding strength between the core member and the resin sheets. In a molding method of a resin molded product in which a core member including a foaming element is interposed between at least two resin sheets in a melted state into a laminated product, wherein the resin sheets include fibrous filler, and while melting surfaces of the core member by heat of the resin sheets, the core member and the resin sheets are welded onto each other, and the core member and the resin sheets are clamped by a metallic mold, to mold the resin molded product.

1 Claim, 7 Drawing Sheets

(51) Int. Cl.
  *B29C 51/26* (2006.01)
  *B29C 48/305* (2019.01)
  *B29C 48/30* (2019.01)
  *B29C 48/08* (2019.01)
  *B29C 48/00* (2019.01)
  *B32B 5/20* (2006.01)
  *B29C 65/00* (2006.01)
  *B29C 65/02* (2006.01)
  *B29C 49/20* (2006.01)
  *B29C 65/74* (2006.01)
  *B29K 25/00* (2006.01)
  *B29L 9/00* (2006.01)

(52) U.S. Cl.
  CPC .............. *B29C 48/08* (2019.02); *B29C 48/30* (2019.02); *B29C 48/305* (2019.02); *B29C 51/12* (2013.01); *B29C 51/267* (2013.01); *B32B 5/20* (2013.01); *B29C 51/262* (2013.01); *B29C 65/028* (2013.01); *B29C 65/7441* (2013.01); *B29C 66/1122* (2013.01); *B29C 66/1142* (2013.01); *B29C 66/433* (2013.01); *B29C 66/721* (2013.01); *B29C 66/727* (2013.01); *B29C 66/81427* (2013.01); *B29C 66/81431* (2013.01); *B29C 2049/2013* (2013.01); *B29C 2948/92561* (2019.02); *B29K 2025/04* (2013.01); *B29L 2009/00* (2013.01); *B32B 2250/03* (2013.01); *B32B 2250/246* (2013.01); *B32B 2451/00* (2013.01); *Y10T 428/249953* (2015.04)

(56) References Cited

U.S. PATENT DOCUMENTS

| | | | |
|---|---|---|---|
| 5,658,519 A * | 8/1997 | March | B29C 47/0016 264/135 |
| 5,725,940 A | 3/1998 | Sakai et al. | |
| 6,358,599 B1 | 3/2002 | Deibel | |
| 6,705,853 B1 * | 3/2004 | Nehring | B29C 51/267 425/388 |
| 8,609,015 B2 | 12/2013 | Sumi et al. | |
| 2005/0248051 A1 * | 11/2005 | Cancio | B29C 55/06 264/154 |
| 2006/0141260 A1 | 6/2006 | Haque | |
| 2007/0256379 A1 | 11/2007 | Edwards | |
| 2007/0287003 A1 * | 12/2007 | Matsumura | C08J 9/18 428/319.3 |
| 2009/0029083 A1 * | 1/2009 | Endo | B29C 49/20 428/36.5 |
| 2010/0104788 A1 | 4/2010 | Kitano et al. | |
| 2011/0101561 A1 | 5/2011 | Tanji et al. | |
| 2012/0061886 A1 | 3/2012 | Sumi et al. | |

FOREIGN PATENT DOCUMENTS

| | | |
|---|---|---|
| JP | 2004-306459 | 11/2004 |
| JP | 2005-125736 | 5/2005 |
| JP | 2006-334801 | 12/2006 |
| JP | 2007-39041 | 2/2007 |
| JP | 2008-222208 | 9/2008 |
| JP | 2008-247003 | 10/2008 |
| JP | 2011-051224 | 3/2011 |
| JP | 2011-51227 | 3/2011 |
| JP | 2012-158075 | 8/2012 |
| WO | 2009/016725 | 2/2009 |
| WO | 2009/136489 | 11/2009 |
| WO | 2009/157197 | 12/2009 |

OTHER PUBLICATIONS

Office Action issued in Japan family member Appl. No. 2011-156086, dated Oct. 20, 2015, along with a partial English translation thereof.

* cited by examiner

MOLDING METHOD OF RESIN MOLDED PRODUCT AND RESIN MOLDED PRODUCT

CROSS-REFERENCE TO RELATED APPLICATION

This application is a Divisional of U.S. application Ser. No. 14/130,003, which is a U.S. National Stage of International Application No. PCT/JP2012/066489 filed Jun. 28, 2012. The disclosures of U.S. application Ser. No. 14/130,003 and International Application No. PCT/JP2012/066489 are expressly incorporated by reference herein in their entireties.

TECHNICAL FIELD

The present invention relates to a resin molded product in which a core member including a foaming element is interposed between at least two resin sheets into a laminated product.

BACKGROUND ART

As technical literature filed prior to the present invention, there are literature (reference is to be made to, for example, patent document 1: WO2009/157197, patent document 2: Japanese Patent Laid-Open Ser. No. 2011-51224, and patent document 3: Japanese Patent Laid-Open Ser. No. 2011-51227) disclosing a molding method of a resin molded product in which a core member is interposed between two resin sheets into a laminated product.

In patent document 1 to 3, two sheet-shaped parisons (corresponding to resin sheets) are supplied between split molds to form the sheet-shaped parisons in a contour along cavities of the split molds. Next, a beforehand molded reinforcing core member (corresponding to the core member) is inserted between the split molds and the reinforcing core member is welded onto one of the sheet-shaped parisons. Next, the split molds are clamped such that the reinforcing core member is welded onto the other one of the sheet-shaped parisons and the sheet-shaped parisons are welded onto each other, to mold a resin molded product in which the reinforcing core member and the sheet-shaped parisons are configured in one block. As a result, there is molded a resin molded product in which a core member is interposed between two resin sheets into a laminated product.

Incidentally, in patent document 1 to 3, the reinforcing core member is welded onto the sheet-shaped parisons formed in a contour along cavities of the split molds; hence, the sheet-shaped parisons are cooled by the split molds and are easily hardened, and the welding strength between the reinforcing core member and the sheet-shaped parisons is lowered depending on cases.

Under this circumstance, the development of a molding method capable of increasing the welding strength between the core member and the resin sheets has been regarded as necessary.

Incidentally, as technical literature filed prior to the present invention, patent document 4 (Japanese Patent Laid-Open Ser. No. 2008-222208) discloses a core board obtained by monoblock-pressing a laminated structure in which a first fibrous substrate, a thermoplastic foam core layer, and a second fibrous substrate are laminated in this order.

In patent document 4, the fibrous substrate includes entangled nonwoven fabric including a fibrous material and a resin binder, and the melting point of the resin element constituting the thermoplastic foam core layer is higher than that of the resin binder. As a result, while stably keeping the contour of the thermoplastic foam core layer even during the heating in the monoblock press, only the resin binder of the fibrous substrate is partly melted and the fibrous substrate is tightly fixed onto the surface of the thermoplastic foam core layer.

PRIOR ART REFERENCE

Patent Document

PATENT DOCUMENT 1: WO2009/157197
PATENT DOCUMENT 2: Japanese Patent Laid-Open Ser. No. 2011-51224
PATENT DOCUMENT 3: Japanese Patent Laid-Open Ser. No. 2011-51227
PATENT DOCUMENT 4: Japanese Patent Laid-Open Ser. No. 2008-222208

SUMMARY OF THE INVENTION

Problems to be Solved by the Invention

In patent document 4, on assumption that the contour of the thermoplastic foam core layer is stably retained even during the heating in the monoblock press, the surface of the thermoplastic foam core layer is not melted.

Hence, in the invention of literature 4 above, even when only the resin binder of the fibrous substrate is partly melted and the fibrous substrate is tightly fixed onto the surface of the thermoplastic foam core layer, there may appear a situation in which the welding strength between the fibrous substrate and the thermoplastic foam core layer is insufficient.

The present invention has been made in consideration of the situation above and aims at providing a molding method of a resin molded product and a resin molded product in which it is possible to increase the welding strength between the core member and the resin sheets.

Means for Solving to the Problems

To achieve the object, the present invention has the following aspects.
<Molding Method of Resin Molded Product>
The molding method of a resin molded product in accordance with the present invention is
a molding method of a resin molded product in which a core member including a foaming element is interposed between at least two resin sheets in a melted state into a laminated product, characterized in that:
the resin sheets comprise fibrous filler, the method comprising:
a welding step in which while melting surfaces of the core member by heat of the resin sheets, the core member and the resin sheets are welded onto each other; and
a molding step in which the core member and the resin sheets are clamped by a metallic mold, to mold the resin molded product.
<Resin Molded Product>
The resin molded product in accordance with the present invention is
a resin molded product in which a core member including a foaming element is interposed between at least two resin sheets into a laminated product, characterized in that:
the resin sheets comprise fibrous filler; and the resin molded product comprises a laminated structure in which the core member with melted surfaces and the resin sheets in a melted state are welded onto each other into one block.

Advantageous Effects of the Invention

In accordance with the present invention, by making the resin sheets in the melted state include the fibrous filler, it is possible to suppress the draw-down; hence, the molding can be conducted by extruding the resin sheets at a high temperature and it is possible to more securely melt the surfaces of the core member to weld the core member onto the resin sheets. As a result, the welding strength between the core member and the resin sheets can be improved. Also, by making the resin sheets in the melted state include the fibrous filler, it is possible to enhance rigidity of the molded product.

DESCRIPTION OF THE EMBODIMENTS

Outline of Resin Molded Product 100 in Accordance with Present Invention

Figure 1:
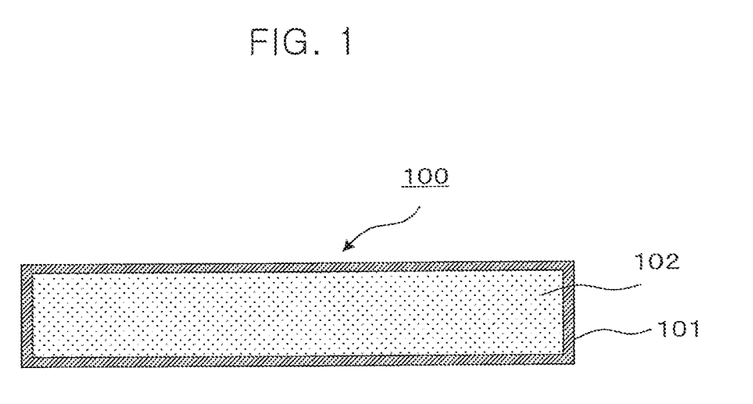
FIG. 1 is a diagram showing a configuration example of a resin molded product 100 of the present embodying mode.

First, by referring to FIGS. 1, 2, 6, and 8, description will be given of an outline of the resin molded product 100 in accordance with the present invention. FIG. 1 shows a configuration example of an embodying mode of the resin molded product 100 in accordance with the present invention, and FIGS. 2, 6, and 8 show a molding method example of the embodying mode of the resin molded product 100 in accordance with the present invention.

The resin molded product 100 in accordance with the present invention is, as shown in FIG. 1, a resin molded product 100 in which a core member 102 including a foaming element is interposed between at least two resin sheets 101 into a laminated product.

The resin sheets 101 configuring the resin molded product 100 in accordance with the present invention contain fibrous filler.

Figure 2:
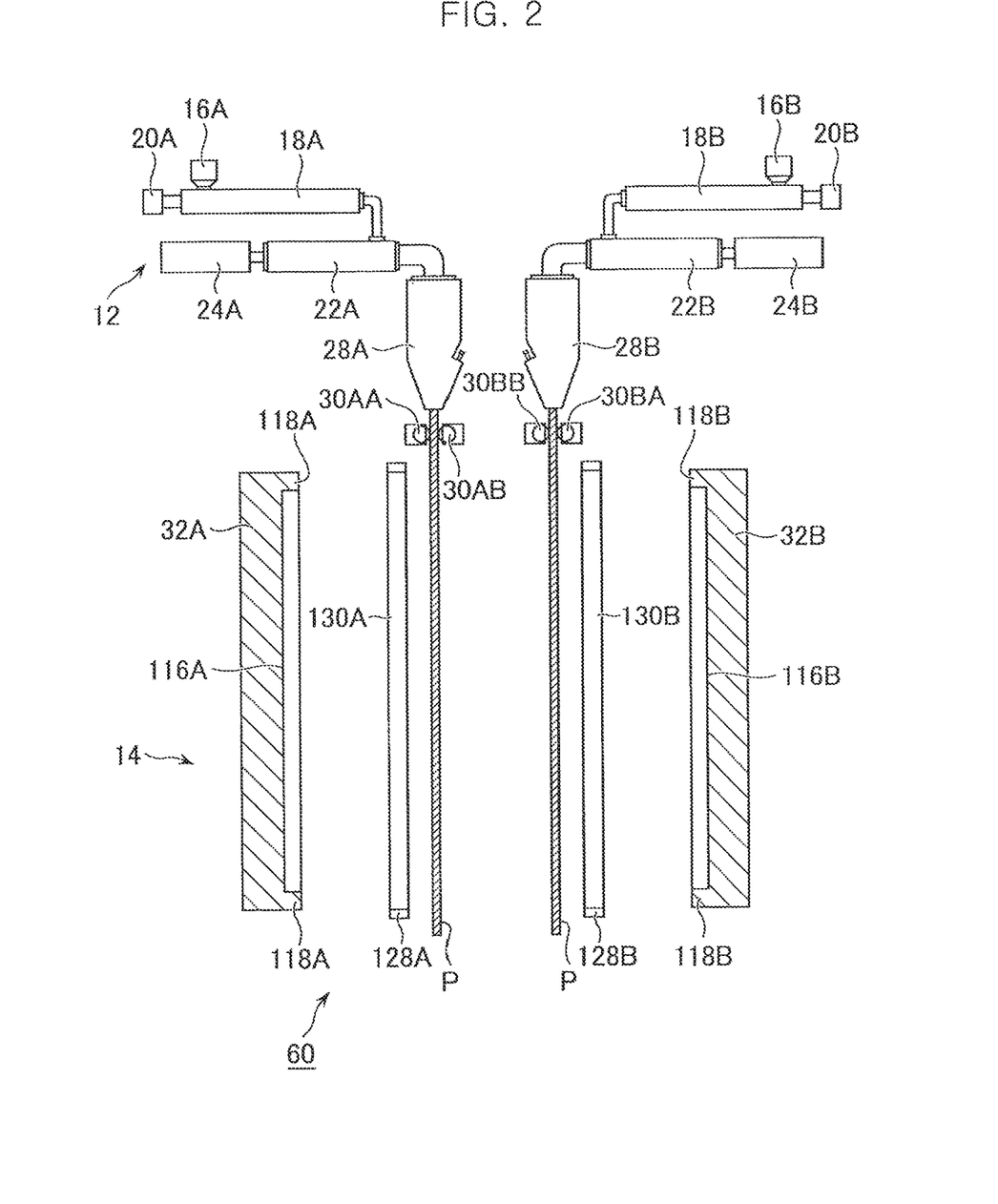
FIG. 2 is a diagram showing a general configuration example of a molding device 60 to mold the resin molded product 100 of the present embodying mode.
Figure 6:
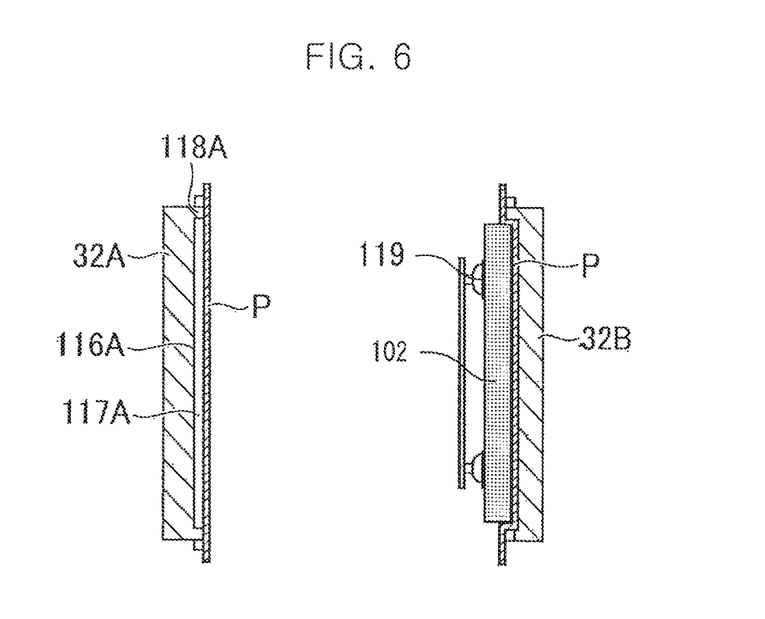
FIG. 6 is a diagram showing a state in which a core member 102 is welded onto one of the resin sheets P.
Figure 8:
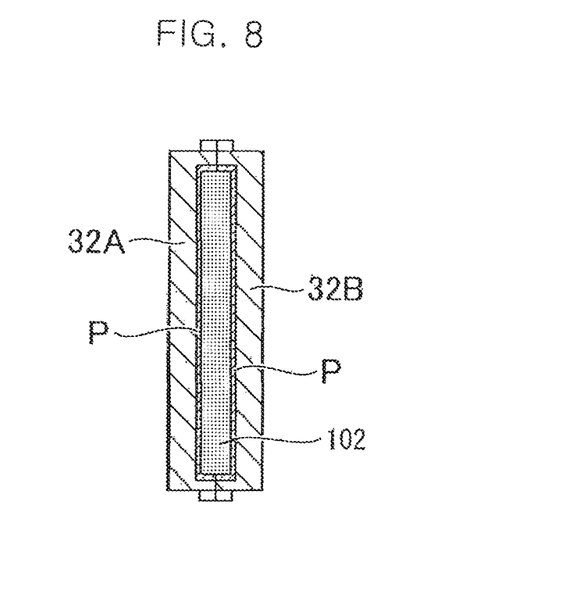
FIG. 8 is a diagram showing a state in which the split mold 32 is clamped.

In the molding of the resin molded product 100 in accordance with the present invention, the molding is conducted by use of, for example, a molding device 60 shown in FIG. 2; as shown in FIGS. 6 and 8, while melting the surfaces of the core member 102 by heat of the resin sheets P, the core member 102 and the resin sheets P are welded onto each other. Also, as shown in FIG. 8, the core member 102 and the resin sheets P are clamped by the mold 32, to mold the resin molded product 100.

As a result, it is possible to mold the resin molded product 100 wherein the core member 102 the surfaces of which are melted and the resin sheets P in the melted state are welded onto each other into a monoblock laminated structure.

Incidentally, in the molding of the resin molded product 100 in accordance with the present invention, since the resin sheets P in the melted state contain fibrous filler, it is possible to suppress the draw-down. This makes it possible to conduct the molding by extruding the resin sheets P at a high temperature, and it is possible to more securely melt the surfaces of the core member 102 to weld the core member 102 and the resin sheets P onto each other. As a result, the welding strength between the core member 102 and the resin sheets P can be improved.

Also, by making the resin sheets P in the melted state contain fibrous filler, it is possible to enhance rigidity of the resin molded product 100. Next, referring to the accompanying drawings, description will be given in detail of the embodying mode of the resin molded product 100 in accordance with the present invention.

<Configuration Example of Resin Molded Product 100>

First, referring to FIG. 1, description will be given of a configuration example of the resin molded product 100 of the present embodying mode. FIG. 1 is a diagram showing a configuration example of the resin molded product 100 of the present embodying mode. The resin molded product 100 of the present embodying mode may be employed, for example, for a deck board of a car.

The resin molded product 100 of the present embodying mode includes lamination in which a core member 102 including a foaming element is interposed between the resin sheets 101.

The core member 102 including a foaming element configures the inner side of the resin molded product 100 and includes styrene-based resin as its main component (at least 30 wt % or more). By configuring it using styrene-based resin as the main component, it is possible to enhance rigidity in a high-temperature environment (for example, 90° C. or more). As the styrene-based resins, acrylonitrile-styrene copolymer (AS), acrylonitrile-butadiene-styrene copolymer (ABS), polystyrene (PS), and anti-shock polystyrene (HIPS) may be considered.

As the core member 102, an item obtained through the molding in which resin beads including a foaming agent are filled in a mold and are heated to foam and an item molded by foam extrusion may be employed.

As the resin beads, heat-resistive foaming polystyrene-based beads (for example, Kanepearl (registered trademark) and Heatmax (registered trademark) made by Kaneka Inc.) and low-foaming molding heat-resistive foaming polystyrene-based beads (for example, Kanepearl (registered trademark) and Heatmax (registered trademark) HM5 made by Kaneka Inc.) may be employed. Also, foaming heat-resistive AS-based resin (for example, Heatpole (registered trademark) made by JSP Inc.) may be employed.

The core member 102 employed as the car deck board preferably has, from a point of view of decrease in weight, a foaming rate of 15 times or more. Also, it favorably has a heat resistive property, specifically, a dimensional change ratio of ±0.5% in 168 hours at 80° C.

Incidentally, for the resin beads configuring the core member 102, for example, the monomer composition configuring the resin beads favorably includes α-methyl styrene at 10 wt % or more and 80 wt % or less, acrylonitrile at 5 wt % or more and 50 wt % or less, and styrene-based monomer at 85 wt % or less; more favorably, α-methyl styrene at 10 wt % or more and 50 wt % or less, acrylonitrile at 5 wt % or more and 35 wt % or less, and styrene-based monomer at 80 wt % or less. For the composition within the range described above, the core member 102 is highly heat resistive and is suitably used for the car deck board. As the styrene-based monomers, there may be considered styrene, and various substituted styrene such as chlorstyrene, para-methyl styrene, and t-butyl styrene.

Further, to assign a fire retardant property to the resin molded product 100, the resin beads used for the core member 102 may contain a fire retardant agent. As the fire retardant agent which develops the fire retardant property and which does not deteriorate the heat resistive property and the foaming property, it is favorable that the fire retardant agent has a decomposition temperature of 210° C. or more, and more favorably, the melting point of the fire retardant agent is 80° C. or more. For such fire retardant agent, halogen-based fire retardant agent can be considered; specifically, hexabrom cyclododecan, tetrabrom bisphenol A, diallyl ether, and monochlor penthabrom cyclohexane can be considered; among these, hexabrom cyclododecan is favorable. The dose of the fire retardant agent favorably ranges from 1 wt % to 15 wt % in the resin beads, more favorably, 3 wt % to 10 wt % therein. When the dose is less than 1 wt %, it is difficult to assign the fire retardant property in some cases; and when the dose is more than 15 wt %, it is likely that the heat resistive property and the foaming property are lowered. Additionally, by using, in addition to the fire retardant agent described above, a small amount of fire retardant assistant agent, it is possible to improve the fire retardant property. As the fire retardant assistant agent employed for such purpose, a radical generating agent such as peroxide is used in general; however, as a favorable fire retardant assistant agent to develop the fire retardant property in the present embodying mode, a fire retardant assistant agent having a half-life temperature per hour of 150° C. or more and 250° C. or less is favorable.

The resin sheet 101 configures the outer side of the resin molded product 100 and, in the resin sheet 101, like in the core member 102, styrene-based resin is contained at least 30 wt % or more. In the resin molded product 100 of the present embodying mode, the core member 102 and the resin sheet 101 contain styrene-based resin at least 30 wt % or more; hence, it is possible to enhance rigidity in a high-temperature environment (for example, 90° C. or more).

Moreover, the resin sheet 101 of the present embodying mode includes fibrous filler. Since the resin sheet 101 of the present embodying mode includes fibrous filler, it is possible to enhance rigidity. As the fibrous filler, there can be considered Warastonite, potassium titanate whiskers, glass fiber, carbon fiber, and the like; particularly, glass fiber and carbon fiber are favorable.

For the fibrous filler of the present embodying mode, the value (aspect ratio) obtained by dividing the length of fiber by the diameter of fiber favorably ranges from 250 to 2000; in particular, from 500 to 1200 from the viewpoint of appropriate molding and improvement of rigidity. Incidentally, when fibrous filler of glass is employed, it is favorable that the length of fiber ranges from 8 mm to 20 mm and the diameter of fiber is equal to or less than 30 μm. This is because when the fiber length is less than 8 mm, the improvement due to filler mixing is small for the heat resistive property and for the rigidity at a high temperature; and when the fiber length is more than 20 mm, the filler is not easily mixed with the substrate resin. In this situation, particularly, it is favorable that fibrous filler with the fiber length from 10 mm to 20 mm and the fiber diameter from about 14 μm to about 17 μm is contained in a range from 20 wt % to 40 wt % (more favorably, about 30 wt %) in the resin sheet 101.

Incidentally, for the styrene-based resins used for the core member 102 and the resin sheet 101, the melting point of the styrene-based resin used for the resin sheet 101 is favorably higher than that of the styrene-based resin used for the core member 102. This makes it possible that while melting the surfaces of the core member 102 by the heat of the resin sheet 101 in the melted state, the core member 102 and the resin sheet 101 are welded onto each other.

<Resin Molded Product 100 Molding Method Example>

Next, referring to FIGS. 2 to 9, description will be given of a molding method example of the resin molded product 100 of the present embodying mode. FIG. 2 shows a configuration example of a molding device 60 to mold the resin molded product 100 of the present embodying mode, and FIGS. 2 to 9 show a molding process example to mold the resin molded product 100 of the present embodying mode.

First, referring to FIG. 2, description will be given of a configuration example of the molding device 60 to mold the resin molded product 100 of the present embodying mode.

The molding device 60 of the present embodying mode includes an extruding machine 12, a clamping machine 14, and a core member inserting machine (not shown).

In the molding device 60 of the present embodying mode, two resin sheets P in a melted state are extruded from the extruding machine 12 to arrange the two resin sheets P between the split molds 32 configuring the clamping machine 14. Next, one of the resin sheets P is formed in a contour along a cavity 116 of the split mold 32, and onto the one resin sheet P thus formed, a core member 102 beforehand molded is welded by the core member inserting machine (not shown). Also, the other one resin sheet P is formed in a contour along a cavity 116 of the split mold 32, and the split mold 32 is clamped to weld the core member 102 onto the other one resin sheet P, and the resin sheets P are welded onto each other, to mold a resin molded product 100 in which the core member 102 and the other one resin sheet P are configured in one block.

The extruding machine 12 includes a cylinder 18 equipped with a hopper 16, a screw (not shown) disposed in the cylinder 18, an electric motor 20 coupled with the screw, an accumulator 22 communicatively connected to the cylinder 18, a plunger 24 communicatively connected to the accumulator 22, and a T die 28.

In the extruding machine 12 of the present embodying mode, resin pellets supplied from the hopper 16 are melted and are kneaded through the rotations of the screw by the electric motor 20 in the cylinder 18 into resin (molten resin) in the melted state. Next, the molten resin is transported to the accumulator 22 such that a fixed quantity thereof is accumulated, and then by the driving of the plunger 24, the molten resin is fed to the T die 28, to extrude, from an extruding slit (not shown) of the T die 28, a resin sheet P in the contour of a continuous sheet.

The resin sheet P extruded from the extruding slit of the T die 28 is clamped by a pair of rollers 30 disposed with a gap therebetween and is delivered downward to be suspended between the split molds 32. As a result, the resin sheet P is arranged between the split molds 32 in a state in which the sheet P has uniform thickness in the perpendicular direction (extruding direction).

Extruding performance of the extruding machine 12 is appropriately selected in consideration of the size of the resin molded product to be molded and the prevention of occurrence of the draw-down or the neck-in of the resin sheet P. Specifically, from the viewpoint of practice, the extruding quantity of one shot in the intermittent extrusion favorably ranges from 1 kg to 10 kg, and the extruding speed of the resin sheet P from the extruding slit is several hundreds of kg/h or more; or, more preferably, 700 kg/h or more. Further, from the viewpoint of the prevention of occurrence of the draw-down or the neck-in of the resin sheet P, the extrusion of the resin sheet P is favorably as short as possible; although depending on the kind of resin, the MFR value, and the melt tension value, it is favorable in general that the extrusion is completed within 40 seconds; or, more preferably, in a range from 10 seconds to 20 seconds.

Hence, the extruding quantity per unitary area (1 cm$^2$) and unitary time (h) of the thermoplastic resin from the extruding slit is 50 kg/h cm$^2$ or more; or, more preferably, 150 kg/h cm$^2$ or more. For example, in a situation wherein from an extruding slit of the T die 28 in which the slit gap is 0.5 mm and the length in the width direction of the slit is 1000 mm, a resin sheet P having a thickness of 1.0 mm, a width of 1000 mm, and a length in extruding direction of 2000 mm is extruded in 15 seconds by use of thermoplastic resin having a density of 0.9 g/cm$^3$, it is regarded that the thermoplastic resin having a weight of 1.8 kg is extruded per one shot in 15 seconds, to obtain through calculation that the extruding speed is 432 kg/h and the extruding speed per unitary area is about 86 kg/h cm$^2$.

Incidentally, the extruding slit disposed in the T die 28 is arranged downward in a perpendicular direction, and the resin sheet P extruded from the extruding slit is perpendicularly transported downward in a state in which it suspends directly from the extruding slit. In the extruding slit, by changing the slit gap, it is possible to change thickness of the resin sheet P.

However, the resin sheet P extruded from the T die 28 is favorably adjusted such that in a state in which it is suspended between the split molds 32, that is, when it is clamped, thickness thereof in the extruding direction is uniform. In this situation, it is also possible to change the slit gap such that the slit gap is gradually enlarged beginning at the extrusion start point to be maximum at the extrusion end point. As a result, the thickness of the resin sheet P extruded from the T die 28 is gradually enlarged beginning at the extrusion start point; however, the resin sheet P extruded in the melted state is extended by its own weight to be gradually thinner from the lower end to the upper end of the sheet; hence, the thick portion extruded by enlarging the slit gap cancels the thin portion due to extension by the draw-down phenomenon, to thereby conduct the adjustment for the uniform thickness from the upper end to the lower end of the sheet.

In the molding device 60 of the present embodying mode, a resin sheet P pinched between a pair of rollers 30 is downward fed by the rotations of the pair of rollers 30, to extend and to thin down the resin sheet P; by adjusting the relationship between the extruding speed of the resin sheet P extruded from the T die 28 and the feeding speed of the resin sheet P fed by the pair of rollers 30, it is possible to prevent occurrence of the draw-down or the neck-in of the resin sheet P. Hence, it is possible to mitigate restrictions on the kind of resin to be adopted, in particular, on the MFR value, the MT value, and the extruding quantity per unitary time.

The pair of rollers 30 are arranged to have axial symmetry with respect to the resin sheet P extruded in a state in which it downward suspends from the extruding slit. The diameter of the rollers 30 and the length in the axial direction of the rollers 30 are appropriately set according to the extruding speed of the resin sheet P to be molded, the length in the extruding direction of the resin sheet P, the width thereof, the kind of resin, and the like. Further, in respective outer surfaces of the pair of rollers 30, there are disposed wrinkles in the contour of depressions and projections. The wrinkles in the contour of depressions and projections are favorably disposed in the outer surfaces of the rollers 30, to be uniformly distributed throughout the surfaces to be brought into contact with the resin sheet P, and the depth and the density thereof are only to be appropriately determined so that the resin sheet P is smoothly fed downward by the pair of rollers 30, in consideration of prevention of occurrence of slippage between the respective outer surfaces of the pair of rollers 30 and the corresponding surfaces of the resin sheet P. Incidentally, although it is possible to form the wrinkles in the contour of depressions and projections, for example, by the sand-blast process, it is favorable to form them by a blast machine by adopting a coarse level of about coarse 60.

Incidentally, the wrinkles in the contour of depressions and projections disposed respectively in the pair of rollers 30 are not disposed to transcribe the wrinkle pattern onto the surfaces of the resin sheet P, but, intrinsically, are disposed to prevent occurrence of slippage between the respective outer surfaces of the pair of rollers 30 and the corresponding surfaces of the resin sheet P.

When transcribing the wrinkle pattern onto the surfaces of the resin sheet P, it is an ordinary practice that one of the pair of rollers is a wrinkle roll and the other one thereof is a lubber roll; however, in the pair of rollers 30 of the present embodying mode, by disposing wrinkles in the outer surfaces respectively of the pair of rollers 30, the pair of rollers 30 respectively and securely hold the corresponding surfaces of the resin sheet P; on the other hand, by restricting the pushing force onto the resin sheet P due to the pair of rollers 30, it is possible to prevent, immediately after feeding the resin sheet P by the pair of rollers 30, the transcription of the wrinkle pattern onto the surfaces of the resin sheet P.

The pair of rollers 30 are made of metal, for example, aluminum; each of the paired rollers 30 is equipped with surface temperature adjusting means to adjust, depending on the temperature of the resin sheet P in the melted state, the surface temperature of the roller 30; in the configuration thereof, by flowing coolant through the inside of the roller 30 and by circulating the coolant, heat exchange is performed such that the surface of the roller 30 is not excessively heated by the resin sheet P in the melted state clamped by the pair of rollers 30.

The outer surfaces of the pair of rollers 30 are heated through heat conduction when the pair of rollers 30 are brought into contact with the resin sheet P in the melted state; by cooling the outer surfaces of the pair of rollers 30 from the inside, an event is prevented in which the resin sheet P in the melted state clamped by the pair of rollers 30 adheres onto the outer surface of the roller 30 and is wound around the roller 30 by the rotations of the roller 30, and the resin sheet P is not fed downward. In this situation, from the viewpoint of prevention of the winding, it is favorable to lower the surface temperature of the rollers 30; however, from the viewpoint of the molding of the resin sheet P later, when the surface temperature of the rollers 30 is too low, the resin sheet P in the melted state is contrarily cooled too much by the surfaces of the rollers 30, to cause hindrances in the molding. Hence, it is required to set the surface temperatures respectively of the pair of rollers 30 to be lower, in a predetermined range of temperature, than the temperature of the resin sheet P in the melted state extruded toward the pair of rollers 30. The predetermined range of temperature is determined according to the kind of the resin sheet P in the melted state. In this situation, to conduct temperature adjustment of the surface temperatures of the pair of rollers 30, when the insides respectively of the pair of rollers 30 are water-cooled, it is desirable to set the temperature of the coolant according to the kind of the resin sheet P; and the temperature of the coolant is to be kept constant during the molding of the resin sheet P.

The clamping machine 14 of the present embodying mode includes the split molds 32 and a mold driving machine (not shown) to move the split molds 32 in a direction substantially vertical to the supply direction of the resin sheets P between an open position and a closed position.

The split molds 32 are arranged in a state in which the cavities 116 oppose each other, and the respective cavities 116 face substantially the perpendicular direction. In the surfaces of the cavities 116, depressions and projections are disposed according to the outer contour and the surface contour of the molded product to be molded based on the resin sheets P in the melted state. Also, in the peripheries of the cavities 116 of the split molds 32, pinch-off sections 118 are formed. The pinch-off sections 118 are formed in a circular contour in peripheries of the cavities 116 and project toward the opposing split molds 32. Hence, it is possible that when the split molds 32 are clamped, the tip end sections of the respective pinch-off sections 118 make contact with each other, to form the parting lines in the circumferential edges of the molded product.

Further, between the split molds 32, flask members 33 are arranged. The flask members 33 include openings 130; by use of flask member driving machines, not shown, the flask members 33 are moved toward the resin sheets P, and the flask members 33 are brought into contact with the resin sheets P, to hold the resin sheets P. Also, in the state in which the resin sheets P are kept held, the flask members 33 moves in the reverse direction, to bring the resin sheets P into contact with the tip ends of the pinch-off sections 118 of the split molds 32; and a sealed space is formed by the sheets of resin P, the pinch-off sections 118, and the cavities 116.

The split molds 32 are driven by the mold driving machine (not shown) so that the resin sheets P in the melted state are arranged between the split molds 32 at the open position. Further, at the closed position, the pinch-off sections 118 of the split molds 32 make contact with each other, to form a sealed space in the split molds 32. Incidentally, for the movement of each split mold 32 from the open position to the closed position, the closed position is the position of the central line of the resin sheets P in the melted state; each split mold 32 is driven by the mold driving machine and moves toward the position.

The resin sheets P includes styrene-based resin as the main component. For the resin sheets P of the present embodying mode, from the viewpoint of prevention of occurrence of dispersion in thickness due to the draw-down and the neck-in, it is favorable to employ styrene-based resin having high melting tension; on the other hand, to improve transcribing performance and tracing performance with respect to the split molds 32, it is favorable to employ styrene-based resin having high fluidity.

As the styrene-based resin employed for the resin sheets P, a styrene-based resin which has MFR (measured at a test temperature of 230° C. and with a test load of 2.16 kg according to JIS K-7210) equal to or less than 3.5 g/10 min at 230° C. is applicable. When MFR is more than 3.5 g/10 min. the draw-down becomes excessive and it is difficult to mold a thin molded product.

Further, the resin sheets P of the present embodying mode include fibrous filler in order to possess the heat resistive property and rigidity. As a result, even after the resin sheets P are extruded from the T dies 28, it is possible to suppress the lowering of temperature of the resin sheets P. Also, even when the resin sheets P are extruded at a high temperature (for example, 210° C. or more) from the T dies 28, it is possible to suppress influence of the draw-down. Ordinarily, when the resin sheets P are extruded at a high temperature (for example, 210° C. or more), the draw-down is conspicuous and the molding is difficult; however, when the fibrous filler is contained in the resin sheets P, it is possible to suppress the influence of the draw-down. Incidentally, in the present embodying mode, the surfaces of the core member 102 are melted by the heat of the resin sheets P; hence, it is favorable that when the resin sheets P are extruded from the T dies 28, the temperature of the resin sheets P is 210° C. or more, and more preferably, 250° C. or more. Hence, to suppress the influence of the draw-down, the resin sheets P of the present embodying mode include fibrous filler.

Further, to the resin sheets P of the present embodying mode, from the viewpoint of the reduction in thickness and the improvement in rigidity, it is also possible to further add powder inorganic filler such as silica, mica, talc, calcium carbonate, and the like. However, when the quantity of added inorganic filler is increased, roughness appears on the surface of the molded product, and pinholes easily take place. Hence, to suppress the roughness on the surface of the molded product and to prevent pinholes from easily taking place, it is favorable to add the inorganic filler at less than 30 wt %.

Further, to the resin sheets P, it is also possible to add plasticizers, stabilizers, coloring agents, antistatic agents, fire retardants, foaming agents, and the like.

Next, referring to FIGS. 2 to 9, description will be given of a molding process example of the resin molded product 100 of the present embodying mode.

First, as shown in FIG. 2, the resin sheets P are extruded from the T dies 28, and the extruded resin sheets P are fed through a pair of rollers 30 to adjust thickness of the resin sheets P and then are suspended between the pair of split molds 32.

In the molding device 60 of the present embodying mode, the relative speed difference between the extruding speed of the resin sheets P and the feed speed at which the resin sheets P are fed downward by the pair of rollers 30 is adjusted by the rotation speed of the pair of rollers 30 such that when the resin sheets P pass between the pair of rollers 30, they are drawn downward by the pair of rollers 30 and are extended to be reduced in thickness; as a result, occurrence of the draw-down or the neck-in is prevented.

In this situation, in each of the pair of rollers 30, wrinkles are dispose in the contour of depressions and projections on the surfaces of the rollers 30 and a gear mechanism is disposed at one end of the rollers 30, to respectively transmit rotation driving force of a rotation driving roller 30BA to a rotation driven roller 30BB and rotation driving force of a rotation driving roller 30AA to a rotation driven roller 30AB such that no rotation speed difference appears between the rotation driving roller 30A and the rotation driven roller 30B, which prevents occurrence of wrinkles or shear marks on the surfaces of the resin sheets P.

Further, in each of the pair of rollers 30, coolant is circulated through the roller 30 to cool the roller 30, to set the temperature of the outer surface of each roller 30 to be lower in a predetermined temperature range than the temperature of the resin sheet P in a melted state, to prevent the event in which when the resin sheet P in a melted state is clamped by the pair of rollers 30, the resin sheet P in a melted state adheres onto the surface the roller 30 and is wound around the roller 30 by the rotations of the roller 30; on the other hand, the resin sheet P is kept in a melted state suitable for the molding.

Incidentally, in association with the adjustment of the number of rotations of the pair of rollers 30, the extruding slit gap adjustment may also be carried out.

Figure 3:
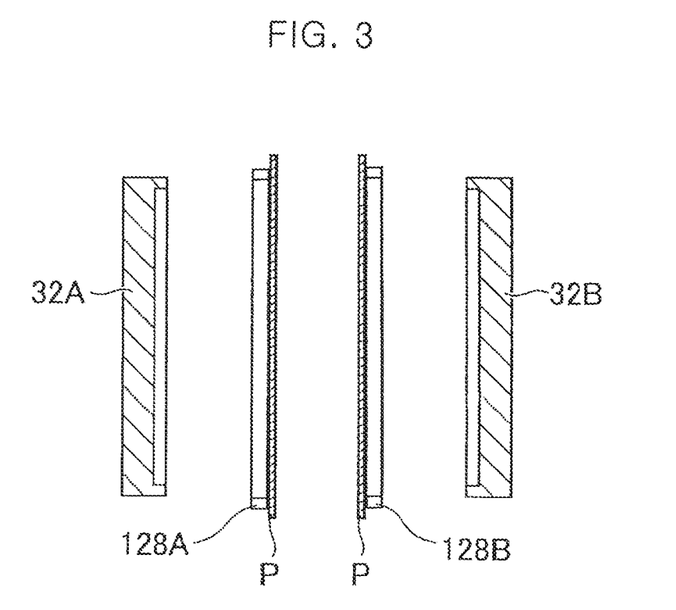
FIG. 3 is a diagram showing a state in which a flask member 128 is brought into contact with a resin sheet P.

When the sheets of resin P are arranged between the split molds 32, flask members 128 are moved by a flask member driving machine (not shown) toward the corresponding sheets of resin P, and as shown in FIG. 3, the flask members 128 are brought into contact with the sheets of resin P, to hold the sheets of resin P by the flask members 128.

Figure 4:
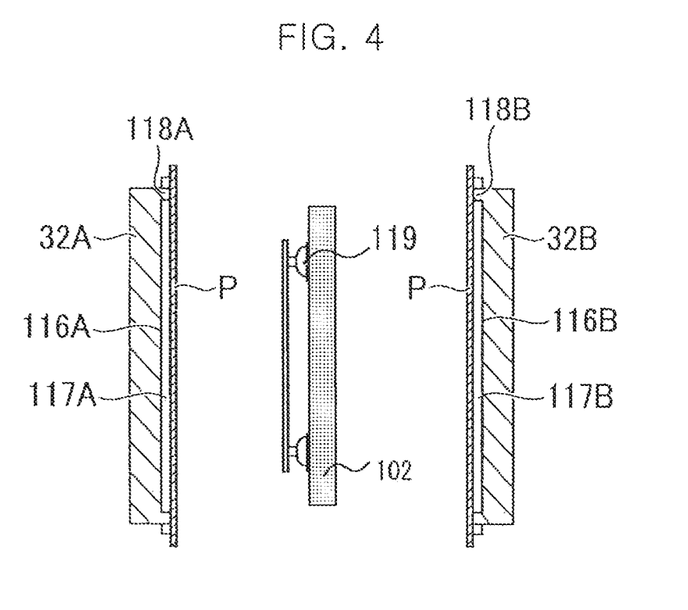
FIG. 4 is a diagram showing a state in which the resin sheet P is brought into contact with a split mold 32.

Next, the flask members 128 are moved toward the split molds 32, and as shown in FIG. 4, the sheets of resin P are brought into contact with the pinch-off sections 118 of the split molds 32, to form a sealed space 117 by the sheets of resin P, the pinch-off sections 118, and the cavities 116. Further, the core member 102 held by adsorbing plates 119 of a manipulator (not shown) is inserted between the split molds 32 as shown in FIG. 4.

Figure 5:
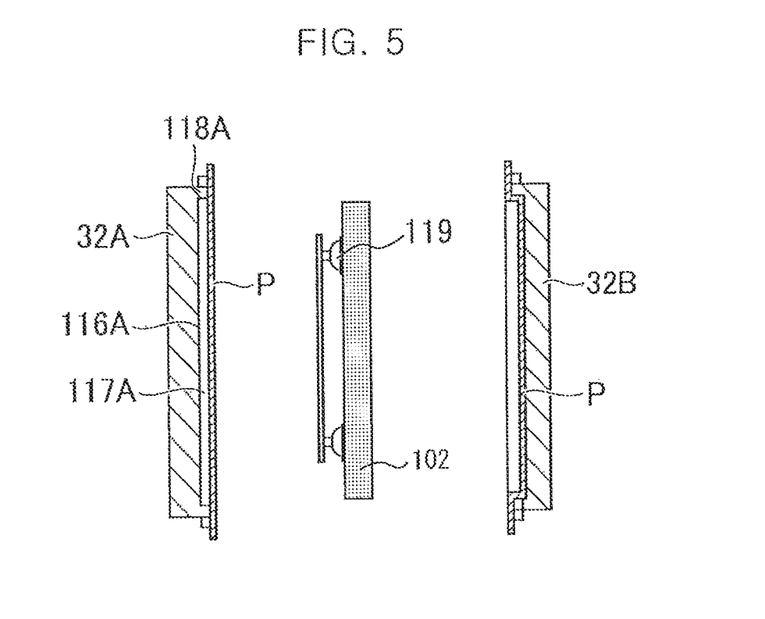
FIG. 5 is a diagram showing a state in which one of the resin sheets P is formed in a contour.

Next, the air in the sealed space 117 is sucked via the split molds 32 to push one of the sheets of resin P onto the cavity 116, to form, as shown in FIG. 5, the one sheet of resin P in a contour according to the cavity 116.

Also, the manipulator is moved toward the split mold 32 on the right side, to push, as shown in FIG. 6, the core member 102 onto the one resin sheet P adsorbed onto the cavity 116 of the split mold 32 on the right side, to weld the core member 102 onto the one resin sheet P.

The resin sheet P of the present embodying mode includes styrene-based resin and fibrous filler; hence, even after the resin sheet P is formed in the contour of the cavity 116, it is possible to retain the state of temperature to melt the surfaces of the core member 102. Hence, when the core member 102 is pushed onto the resin sheet P, the surfaces of the core member 102 can be melted by the heat of the resin sheet P. As a result, in the present embodying mode, while melting the surfaces of the core member 102 by the heat of the resin sheet P, the core member 102 can be welded onto the resin sheet P.

Figure 7:
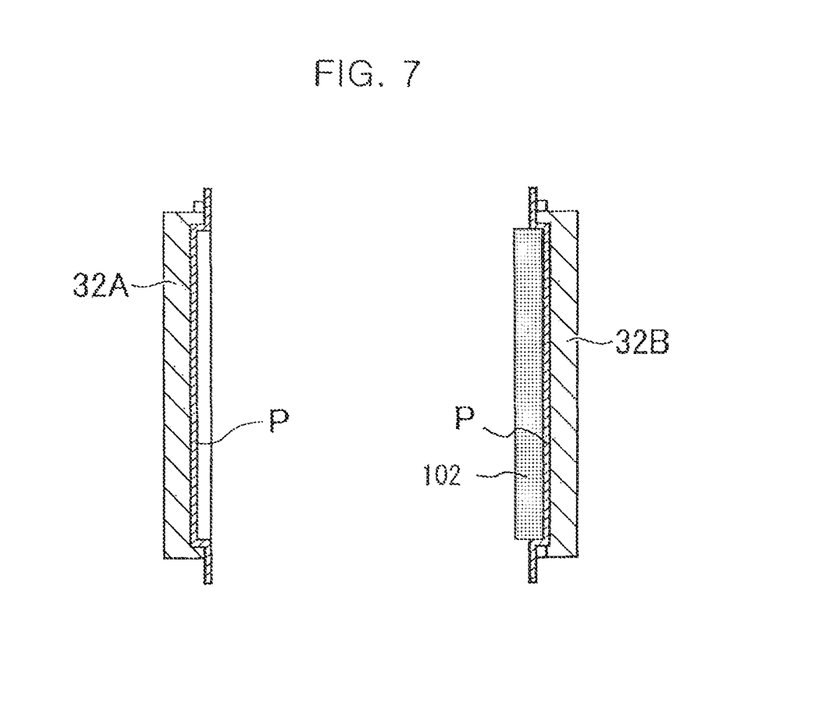
FIG. 7 is a diagram showing a state in which the other one of the resin sheets P is formed in a contour.

Next, the adsorbing plates 119 are removed from the core member 102 and the manipulator is pulled to be removed from the space between the two split molds 32, and the other one resin sheet P is pushed onto the cavity 116, to form, as shown in FIG. 7, the other one resin sheet P in the contour along the cavity 116.

Next, the two split molds 32 are clamped by the mold driving machine, and as shown in FIG. 8, the core member 102 is pushed onto the other one resin sheet P adsorbed onto the cavity 116 of the split mold 32 on the left side, to weld the core member 102 onto the other one resin sheet P. Moreover, peripheries respectively of the two resin sheets P are welded onto each other to form parting lines PL.

Incidentally, the surfaces of the core member 102 of the present embodying mode are melted by the heat of the resin sheets P; hence, when the split molds 32 are clamped to mold a resin molded product 100 in which the core member 102 and the resin sheets P are formed in one block, it is favorable to compress the core member 102 and the resin sheets P by the split molds 32. As a result, the welding strength between the core member 102 and the resin sheets P is further enhanced.

Figure 10:
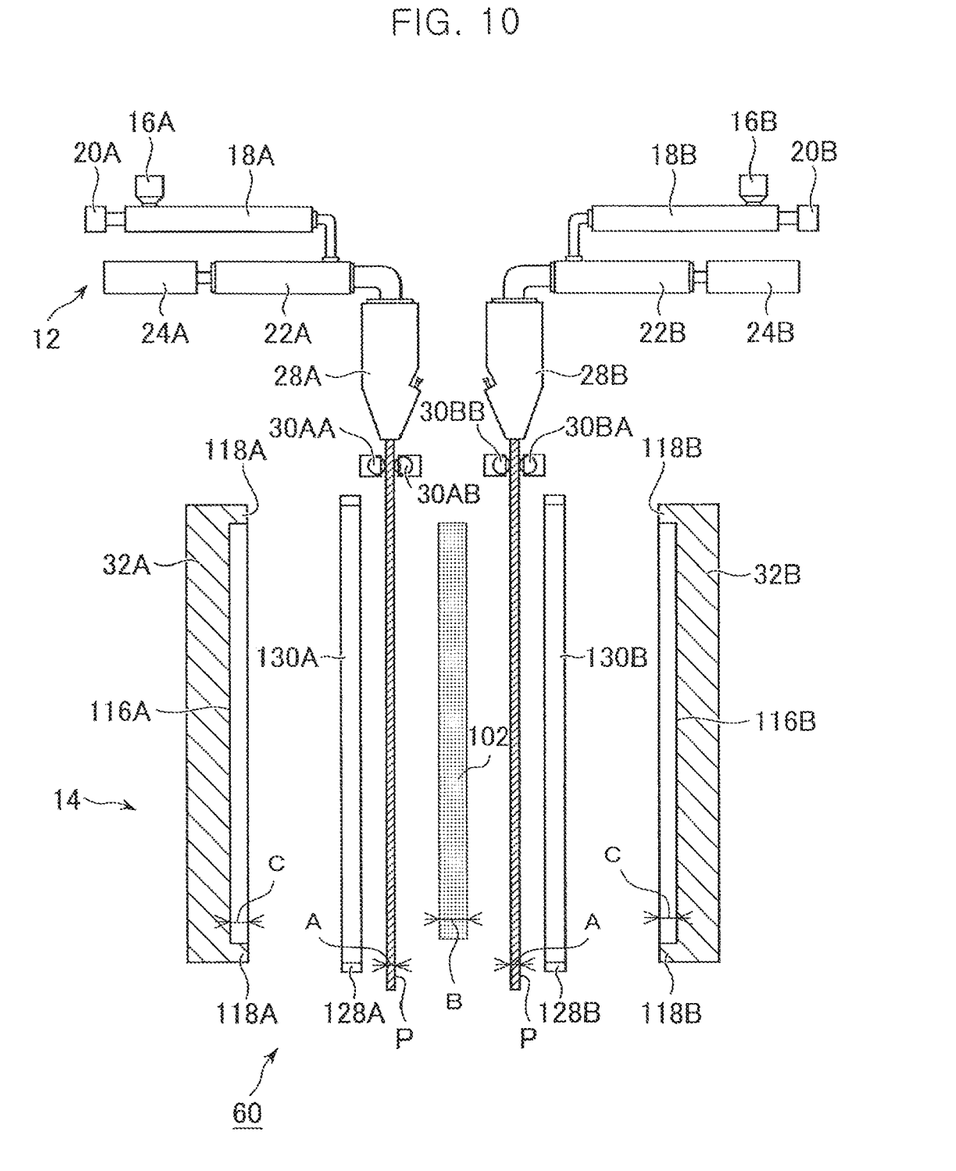
FIG. 10 is diagram showing a relationship example among thickness A of the resin sheets P, thickness B of the core member 102, and depth C of the split mold 32 in a situation in which the resin sheets P and the core member 102 are compressed by the split mold 32.

For example, as shown in FIG. 10, when two resin sheets S configuring the resin molded product 100 have thickness A as A=1 mm and the core member 102 has thickness B as B=15 mm, it is favorable that the cavities 116 of the split molds 32 have depth C as C=8 mm and the core member 102 and the resin sheets S are compressed by about 1 mm. In this situation, the sealed space formed when the split molds 32 are clamped has width 2C as 2C=16 mm, and the total thickness of the two resin sheets P and the core member 102 is 2A+B=17 mm; hence, the resin molded product 100 clamped by the split molds 32 is compressed by 0.5 mm by each of the split molds 32. As a result, the fibrous filler contained in the resin sheets P is easily pushed into the core member 102; hence, it is possible that the welding between the resin sheets P and the core member 102 is stronger and it is possible to mold the resin molded product 100 with high rigidity. Incidentally, when compressing by the split molds 32, it is favorable that the compression is performed in a range from about 0.5 mm to about 1.0 mm by each of the split molds 32.

Through the processes described above, a resin molded product in which the core member 102 and the resin sheets P are laminated is completely produced.

Figure 9:
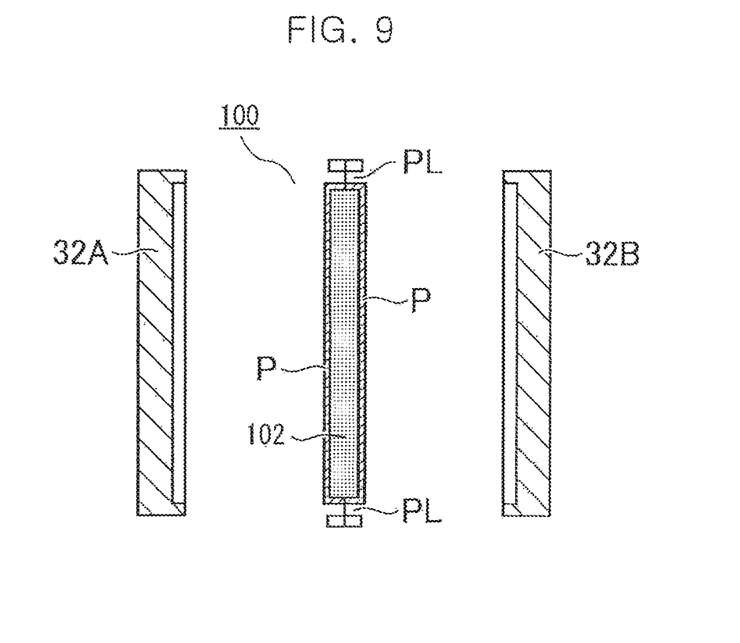
FIG. 9 is a diagram showing a state in which the split mold 32 is unclamped.

Next, as shown in FIG. 9, the two split molds 32 are unclamped and the cavities 116 are removed from the completed resin molded product 100, and then burrs formed in peripheries of the parting lines PL are removed. This completes the molding of the resin molded product 100.

<Operation and Effects of Resin Molded Product 100 of Present Embodying Mode>

As above, the resin sheets 101 configuring the resin molded product 100 of the present embodying mode contain fibrous filler. And when molding the resin molded product 100, while melting, as shown in FIGS. 6 and 8, the surfaces of the core member 102 by the heat of the resin sheets P in the melted state, the core member 102 and the resin sheets P are welded onto each other. And as shown in FIG. 8, the core member 102 and the resin sheets P are clamped by the split molds 32, to mold the resin molded product 100.

In the molding of the resin molded product 100 of the present embodying mode, since the resin sheets P in the melted state contain fibrous filler, it is possible to suppress draw-down. This makes it possible that the molding is conducted by extruding the resin sheets P at high temperature and the surfaces of the core member 102 are more securely melted, to weld the core member 102 and the resin sheets P onto each other. As a result, the welding strength between the core member 102 and the resin sheets P can be improved. Also, by making the resin sheets P contain fibrous filler, it is possible to enhance rigidity of the resin molded product 100.

In addition, since the core member 102 and the resin sheets P configuring the resin molded product 100 of the present embodying mode include styrene-based resin as the primary component, it is possible to further enhance the welding strength between the core member 102 and the resin sheets P and the rigidity of the resin molded product 100.

Incidentally, the embodying modes described above are favorable embodying modes of the present invention, and the scope of the present invention is not limited only to these embodying modes, but various changes may be made therein without departing from the gist of the present invention.

For example, in the molding method of the embodying mode; as shown in FIG. 4, the sheets of resin P are brought into contact with the pinch-off sections 118 of the split molds 32, to form a sealed space 117 by the sheets of resin P, the pinch-off sections 118, and the cavities 116, and then the core member 102 is inserted between the split molds 32. However, it is also possible that before the sheets of resin P are extruded from the T dies 28 to a space between the split molds 32, the core member 102 is beforehand inserted between the split molds 32. This makes it possible to warm up the surfaces of the core member 102 by the heat of the sheets of resin P extruded from the T dies 28.

Further, in the molding method of the embodying mode, after two resin sheets P are arranged between the split molds 32, the core member 102 is sequentially welded onto the two resin sheets P. However, it is also possible that while separately arranging two resin sheets P in the split molds 32, the core member 102 is sequentially welded onto the two resin sheets P. Specifically, first, one of the resin sheets P is arranged in the split molds 32, to form the resin sheet P in a contour along the cavity of the split mold 32, and then the core member 102 is welded onto the resin sheet P. Further, the other one of the resin sheets P is arranged in the split molds 32, to form the resin sheet P in a contour along the cavity of the split mold 32, and then the core member 102 is welded onto the resin sheet P. As a result, it is possible to shorten the time lapsed by when the core member 102 is welded onto the resin sheets P extruded from the T dies 28; hence, the surfaces of the core member 102 can be easily melted by the heat of the resin sheets P.

Additionally, in the molding method described above, without conducting any warming process for the core member 102, the core member 102 is welded onto the resin sheets P while melting the surfaces of the core member 102 by the heat of the resin sheets P. However, in the molding method described above, it is also possible to warm up, before the core member 102 is inserted between the split molds 32, the surfaces of the core member 102 in advance by warming means such as an infrared heater.

Further, it is also possible, as shown in FIG. 6, that the surfaces of the core member 102 are warmed up in advance by warming means before the core member 102 is pushed onto the one resin sheet P adsorbed onto the cavity 116 of the split mold 32 on the right side and the core member 102 is welded onto the one resin sheet P.

Moreover, it is also possible, as shown in FIG. 8, that the surfaces of the core member 102 are warmed up by warming means before the core member 102 is pushed onto the other one resin sheet P adsorbed onto the cavity 116 of the split mold 32 on the left side and the core member 102 is welded onto the other one resin sheet P.

That is, it is possible, before the core member 102 and the resin sheets P are welded onto each other, to warm up the surfaces of the core member 102 by warming means to beforehand melt the surfaces of the core member 102.

Incidentally, timing to warm up the surfaces of the core member 102 by warming means is not particularly restricted; only if the timing is before the resin sheets P and the core member 102 are welded onto each other, it is possible to warm up the surfaces of the core member 102 at any timing.

Further, in the embodying mode described above, it is also possible that a decorative sheet is arranged between the split molds 32 such that the decorative sheet is welded onto the resin sheets P by clamping the split molds 32. Moreover, it is also possible that a decorative sheet is supplied together with the resin sheets P to a space between a pair of rollers 30 such that by adjusting the rotation speed of the pair of rollers 30, thickness of the resin sheets P is adjusted and the decorative sheet is pushed to be tightly fixed onto the resin sheets P.

In addition, the resin molded product 100 of the embodying mode described above is molded by interposing the core member 102 between two resin sheets P. However, it is only required that the resin molded product 100 of the embodying mode is molded by interposing the core member 102 between at least two resin sheets P; for example, it is also possible to mold the product by interposing the core member 102 by four resin sheets P. The layer configuration of the resin molded product 100 in this situation is as resin sheet/resin sheet/core member/resin sheet/resin sheet.

DESCRIPTION OF REFERENCE NUMERALS

100 Resin molded product
102 Core member
101, P Resin sheet
60 Molding machine
12 Extruding machine
14 Clamping machine
16 Hopper
18 Cylinder
20 Electric motor
22 Accumulator
24 Plunger
28 T die
30 Roller
32 Split mold
128 Flask member
130 Opening
116 Cavity
118 Pinch-off section

What is claimed is:

1. A molding method of a resin molded product having a core with a foaming element interposed between at least two resin sheets in a melted state to form a laminated product, the resin sheets including fibrous filler, the method comprising:

suspending the resin sheets downward in a melted state by extruding the resin sheets from an extruding slit, an extruding speed of the resin sheet from the extruding slit being 700 kg/h or more, a extruding quantity per unitary area and unitary time of the thermoplastic resin from the extruding slit is 150 kg/h cm2 or more and the extrusion being completed in a range from 10 seconds to 20 seconds, and a slit gap being gradually enlarged beginning at the extrusion start point to be maximum at the extrusion end point, and the temperature of the resin sheets being extruded being 250° C. or more, and thinning each of the extruded resin sheets by pinching the extruded resin sheets between a pair of rollers, the pair of the rollers each having wrinkles in the contour of depressions and projections on outer surfaces to be brought into contact with the resin sheet, and a gear mechanism being disposed at one end of the rollers, and having an adjustable surface temperature means which flows coolant through the inside of the roller and circulating the coolant, the temperature of the coolant being to be kept constant during the molding of the resin sheet P, while melting surfaces of the core by heat of the resin sheets, welding the core and the resin sheets onto each other; and clamping the core and the resin sheets by metallic molds such that, when clamped, a sealed space is formed having a width smaller than a total of a thickness of the core and a thickness of the resin sheets, and the resin sheets are compressed in a range from 0.5 mm to 1.0 mm, to mold the resin molded product, wherein a melting point of a resin used for the resin sheets is higher than that of a resin used for the core wherein the resin sheet includes fibrous filler in a range from 20 wt % to 40 wt %, the core and the resin sheet include styrene-based resin at least 30 wt % or more, styrene-based resin has MFR equal to or less than 3.5 g/10 min at 230° C., the core has a foaming rate of 15 times or more and a dimensional change ratio within ±0.5% in 168 hours at 80° C., the fibrous filler is glass fiber, the value of aspect ratio of the filler ranges from 500 to 1200, the fiber length is from 10 mm to 12 mm, and the fiber diameter is from 14 μm to about 17 μm, the core includes resin beads, which contain a fire-retardant agent, the resin beads include α-methyl styrene at 10 wt % or more and 50 wt % or less, acrylonitrile at 5 wt % or more and 35 wt % or less, and styrene-based monomer at 80 wt % or less, a dose of the fire-retardant agent ranges from 3 wt % to 10 wt % in the resin beads, the fire-retardant agent is selected from the group consisting of hexabrom cyclododecan, tetrabrom bisphenol A, diallyl ether, and monochlor pentabrom cyclohexane, and the fire-retardant assistant agent has a half-life temperature per hour of 150° C. or more and 250° C. or less.

\* \* \* \* \*